(No Model.)  4 Sheets—Sheet 1.

J. C. GITHENS.
Universal Joint for Tripod Legs and Other Purposes.

No. 230,935. Patented Aug. 10, 1880.

Witnesses:
M. L. Adams.
Geo. W. Miatt

Inventor:
Joseph C. Githens
Per Edw. E. Quimby
Atty (No Model.)  J. C. GITHENS.  4 Sheets—Sheet 2.

Universal Joint for Tripod Legs and Other Purposes.
No. 230,935.  Patented Aug. 10, 1880.

Witnesses:
M. L. Adams
Geo. W. Miatt

Inventor:
Joseph C. Githens
Per Edw. E. Quimby
Atty.

(No Model.) J. C. GITHENS. 4 Sheets—Sheet 3.
Universal Joint for Tripod Legs and Other Purposes.
No. 230,935. Patented Aug. 10, 1880.

(No Model.)

J. C. GITHENS.
Universal Joint for Tripod Legs and Other Purposes.
No. 230,935. Patented Aug. 10, 1880.

Witnesses:
M. L. Adams.
Geo. W. Miatt

Inventor:
Joseph C. Githens
Per Edw. E. Quimby
Atty.

UNITED STATES PATENT OFFICE.

JOSEPH C. GITHENS, OF NEW YORK, N. Y., ASSIGNOR TO RAND DRILL COMPANY, OF SAME PLACE.

UNIVERSAL JOINT FOR TRIPOD-LEGS AND OTHER PURPOSES.

SPECIFICATION forming part of Letters Patent No. 230,935, dated August 10, 1880.

Application filed July 2, 1880. (No model.)

*To all whom it may concern:*

Be it known that I, JOSEPH C. GITHENS, of the city and State of New York, have invented an Improved Universal Joint for Tripod-Legs and other Purposes, of which the following is a specification.

My improvement is especially applicable to tripods employed for the support of steam rock-drills, in which great facility of adjustment is desirable both for the drill-cylinder and for the tripod-legs.

My invention, which relates particularly to a novel mode of constructing universal joints for connecting together two objects—such as, for example, the leg and body or head of a tripod—consists in forming the head of the tripod-leg of two parts, the one consisting of a disk cast upon the side of the tube, into which the upper end of the leg is inserted, and the other consisting of a sleeve presenting on one side a partially-flanged circular face, affording the seat for the disk, the edge of the disk being preferably beveled backward from its face, and the partial flange being correspondingly inclined inward toward the center of the face upon which the disk bears. The disk is maintained upon its seat with its edge against the partial flange by an inclined circular lip formed upon the head of a key-bolt which is inserted through the sleeve and through a perforated lug formed upon the tripod-head or other object with which the joint is to be connected. A nut upon the projecting end of the key-bolt prevents its withdrawal from the perforated lug, but permits its rotation therein. The perforated lug thus defines one axis of oscillation of the joint, while the other axis of oscillation is defined by the lip on the head of the key-bolt and the flange extending partly around the side of the sleeve, upon which the disk is seated, and through which the key-bolt is inserted.

Figure 1:
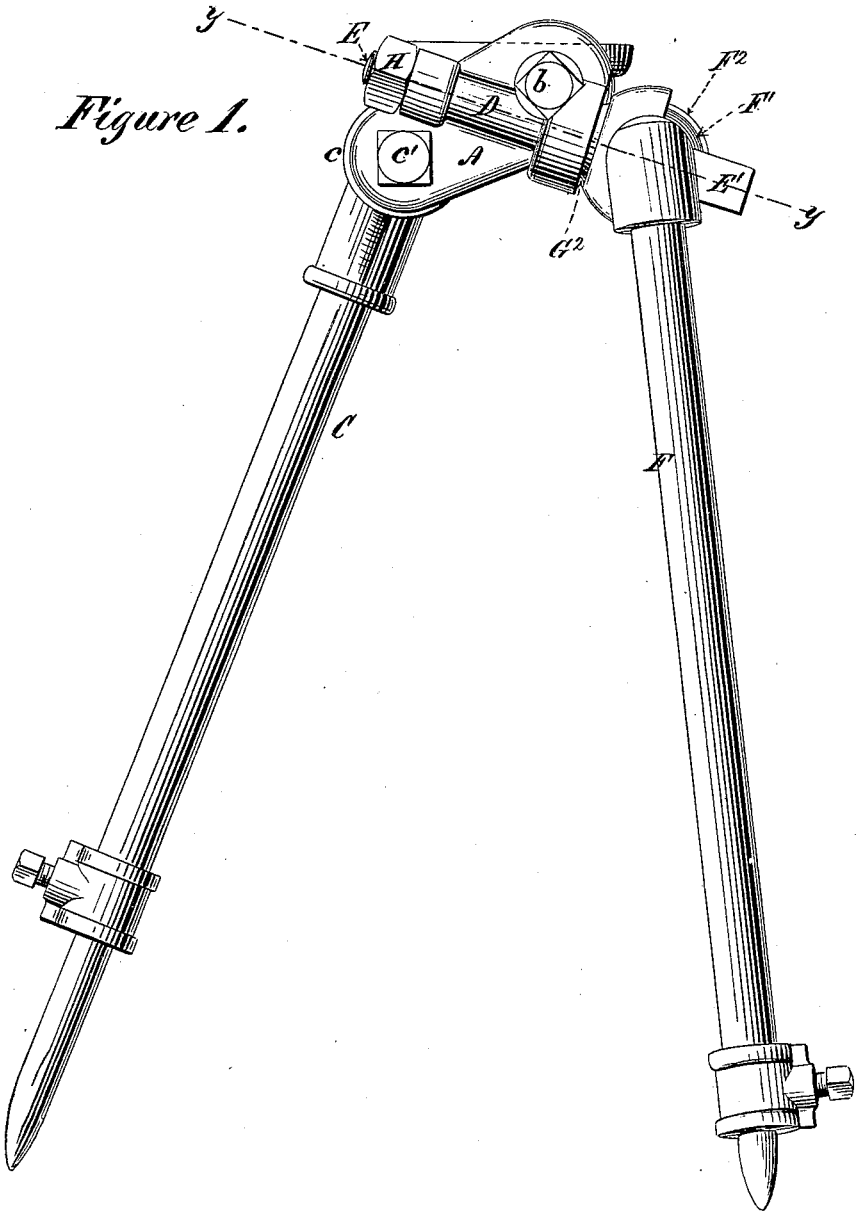
Figure 2:
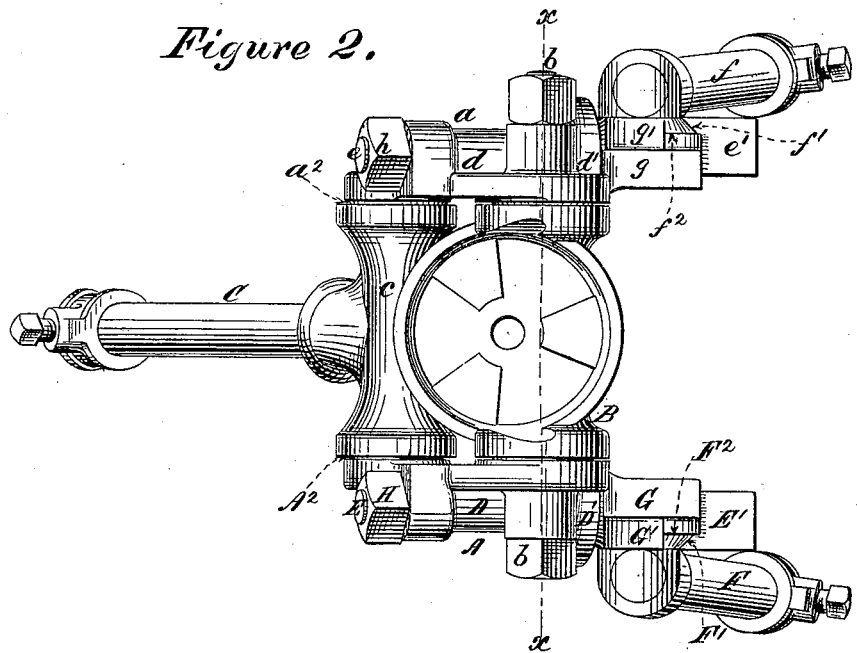
Figure 3:
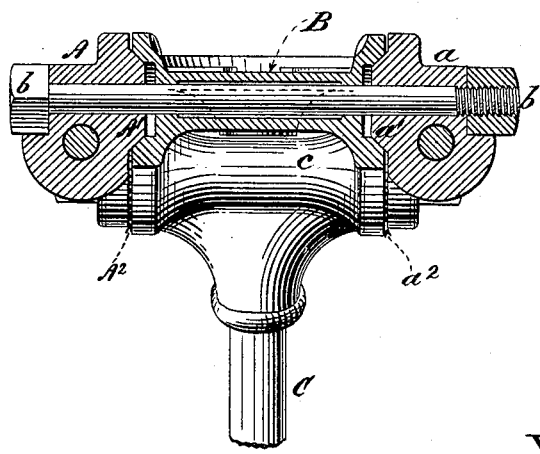
Figures 4, 5:
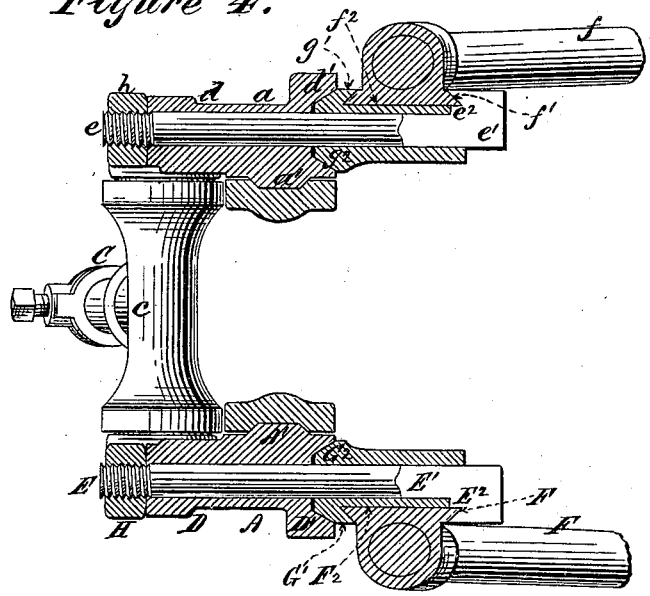
Figure 6:
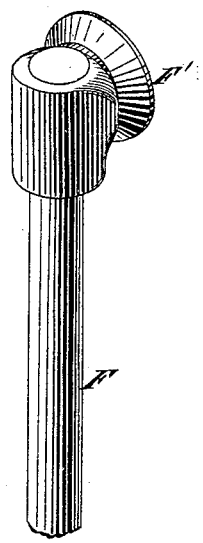
Figure 7:
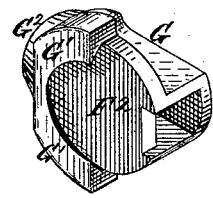
Figure 8:
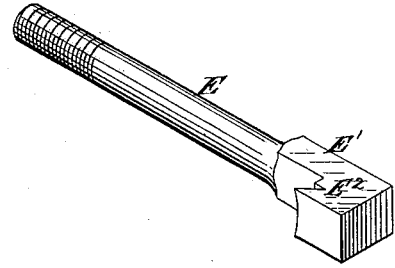

In the accompanying drawings, representing a tripod embodying my improvements, Figure 1 is a side elevation. Fig. 2 is a top view. Fig. 3 is a vertical section through the line $x\ x$ on Fig. 2, extending longitudinally through the oscillating shaft which supports the drill-cylinder. Fig. 4 is a horizontal section through the line $y\ y$ on Fig. 1. Fig. 5 is an isometrical perspective of one of the side bars. Fig. 6 is an isometrical perspective of the sleeve or movable part of the head of the front leg. Fig. 7 is an isometrical perspective of the sleeve or movable part of the head of the front leg. Fig. 8 is an isometrical perspective of the key-bolt, by means of which the two parts of the head of the front leg are held together and connected with the tripod-head.

The drawings represent a tripod-head composed of the two side bars A $a$, the transverse hollow shaft B, upon which the drill-cylinder is mounted, and the hollow cross-head $c$ of the rear leg, C. The hollow shaft B is cupped at each end to receive the conical projections A′ $a'$, cast respectively upon the two side bars A $a$, and is secured to the side bars by the transverse bolt $b$. The hollow cross-head $c$ of the rear leg is also cupped at the ends to receive the similar conical projections A² $a^2$, cast upon the side bars, and the side bars and cross-head are secured together by the transverse bolt $c$. Diagonally across the outer face of the side bars, respectively, are cast the lugs D $d$, which are longitudinally perforated to receive the key-bolts E $e$, which respectively hold together the two parts of the heads of the front legs, F and $f$. The fixed parts of the heads of the front legs are short tubes, into which the upper ends of the legs are inserted, and which have formed upon their sides, respectively, the disks F′ $f'$. These disks are beveled upon their edges, and are respectively provided with seats F² $f^2$ upon the sides of the sleeves G $g$, which constitute the movable parts of the heads of the front legs, respectively. The disks are held against the sleeves, respectively, on one side by the inwardly-inclined circular flanges G′ and $g'$, cast upon and extending partially around their seats F² and $f^2$, and upon the other side by the inwardly-projecting curved lips E² $e^2$, formed upon the heads E′ $e'$ of the key-bolts E $e$. The sleeves G $g$ are longitudinally perforated to admit the key-bolts E $e$, respectively, and upon their inner ends are provided with conical projections G² $g^2$, which are seated, respectively, in the cupped ends D′ $d'$ of the diagonal lugs D $d$.

The key-bolts are respectively prevented from withdrawing from the perforated lugs by the nuts H h on their projecting ends.

It will, of course, be understood that transverse keys inserted through slots in the ends of the key-bolts may, if desired, be substituted for the nuts H h. By this construction each front leg is provided with two axes of oscillation at relatively right angles with each other, and the tripod is consequently given a greatly enlarged capacity of adjustment.

It will be seen that my universal joint is composed of five members, including the two objects which are to be united by it. These members are, first, the disk formed upon and constituting a part of one of these two objects; second, the sleeve, upon the side of which the disk is journaled: third, the key-bolt, which is inserted through the sleeve and holds the disk upon its seat; fourth, the perforated lug, in which the key-bolt is journaled, and which is formed upon and constitutes a part of the other of the two objects to be united; and, fifth, the nut on the projecting end of the key-bolt, which prevents the withdrawal of the key-bolt from the perforated lug.

This construction is both simple and substantial, and may be usefully employed for any purpose where a universal joint is required.

I claim as my invention—

1. A tripod, substantially such as described, having two of its legs respectively united to the tripod-head by universal joints, substantially as and for the purpose set forth.

2. A universal joint composed of five members, to wit: a disk journaled upon the side of a sleeve, such sleeve being suspended upon a key-bolt, and the key-bolt being inserted through a perforated lug and prevented from withdrawal therefrom by a nut or transverse key applied to its projecting end.

JOSEPH C. GITHENS.

Witnesses:
M. L. ADAMS,
EDWD. PAYSON.